United States Patent
Chae et al.

(10) Patent No.: US 11,384,227 B2
(45) Date of Patent: Jul. 12, 2022

(54) RESIN COMPOSITION FOR BI-COMPONENT FIBER

(71) Applicant: LG Chem, Ltd., Seoul (KR)

(72) Inventors: Seong Min Chae, Daejeon (KR); Jihwa Ye, Daejeon (KR); Kyung Seop Noh, Daejeon (KR); Heekwang Park, Daejeon (KR); Taejin Kim, Daejeon (KR); Daeyeon Lee, Daejeon (KR)

(73) Assignee: LG Chem, Ltd.

( * ) Notice: Subject to any disclaimer, the term of this patent is extended or adjusted under 35 U.S.C. 154(b) by 183 days.

(21) Appl. No.: 16/963,980

(22) PCT Filed: Nov. 4, 2019

(86) PCT No.: PCT/KR2019/014829
§ 371 (c)(1),
(2) Date: Jul. 22, 2020

(87) PCT Pub. No.: WO2020/096307
PCT Pub. Date: May 14, 2020

(65) Prior Publication Data
US 2021/0040294 A1   Feb. 11, 2021

(30) Foreign Application Priority Data

Nov. 5, 2018  (KR) .................. 10-2018-0134672
Nov. 1, 2019  (KR) .................. 10-2019-0138936

(51) Int. Cl.
*C08L 23/06* (2006.01)
*C08L 23/12* (2006.01)

(52) U.S. Cl.
CPC ............. *C08L 23/06* (2013.01); *C08L 23/12* (2013.01); *C08L 2207/53* (2013.01)

(58) Field of Classification Search
CPC ................................................ C08L 2207/53
See application file for complete search history.

(56) References Cited

U.S. PATENT DOCUMENTS

| | | | |
|---|---|---|---|
| 6,759,357 B1 | 7/2004 | Toriumi | |
| 2004/0038022 A1 | 2/2004 | Maugans et al. | |
| 2008/0214767 A1 | 9/2008 | Mehta et al. | |
| 2012/0208422 A1 | 8/2012 | Koori et al. | |
| 2013/0239283 A1 | 9/2013 | Yokoyama et al. | |
| 2013/0309931 A1 | 11/2013 | Koori et al. | |
| 2015/0308039 A1 | 10/2015 | Bonaboglia et al. | |
| 2016/0208028 A1 | 7/2016 | Choi et al. | |
| 2019/0106516 A1 | 4/2019 | Park et al. | |

FOREIGN PATENT DOCUMENTS

| | | | |
|---|---|---|---|
| EP | 2231726 A1 | 9/2010 | |
| EP | 3572441 A1 | 11/2019 | |
| JP | H09273060 A | 10/1997 | |
| JP | 2003226783 A | 8/2003 | |
| JP | 2013032607 A | 2/2013 | |
| JP | 2015036386 A | 2/2015 | |
| JP | 2016501746 A | 1/2016 | |
| JP | 2017526834 A | 9/2017 | |
| JP | 2017193806 A | 10/2017 | |
| KR | 20020086716 A | 11/2002 | |
| KR | 20120113896 A | 10/2012 | |
| KR | 20130015078 A | 2/2013 | |
| KR | 20150037652 A | 4/2015 | |
| KR | 20150095665 A | 8/2015 | |
| KR | 20180040405 A | 4/2018 | |
| KR | 20180051222 A | 5/2018 | |
| KR | 20180054357 A | 5/2018 | |
| KR | 20180057469 A | 5/2018 | |
| WO | 2001053585 A1 | 7/2001 | |
| WO | 2011030893 A1 | 3/2011 | |
| WO | 2012105567 A1 | 8/2012 | |

OTHER PUBLICATIONS

International Search Report for Application No. PCT/KR2019/014829 dated Feb. 17, 2020, 2 pages.
Wente, et al., "Manufacture of Superfine Orgainic Fibers," Report No. 4364 of the Naval Research Laboratories, May 25, 1954, 24 pages.
Extended European Search Report for Application No. 19882203.3, dated Mar. 26, 2021, 9 pages.

*Primary Examiner* — Catherine S Branch
(74) *Attorney, Agent, or Firm* — Lerner, David, Littenberg, Krumholz & Mentlik, LLP

(57) ABSTRACT

The present invention provides a resin composition for core-sheath type bi-component fiber that not only maintains excellent softness, but also improves tensile strength, when preparing non-woven fabric, particularly spunbond non-woven fabric.

18 Claims, No Drawings

RESIN COMPOSITION FOR BI-COMPONENT FIBER

CROSS-REFERENCE TO RELATED APPLICATIONS

This application is a national phase entry under 35 U.S.C. § 371 of International Application No. PCT/KR2019/014829 filed Nov. 4, 2019, which claims priority from Korean Patent Application No. 10-2018-0134672 filed Nov. 5, 2018, and Korean Patent Application No. 10-2019-0138936 filed Nov. 1, 2019, all of which are incorporated herein by reference.

TECHNICAL FIELD

The present invention relates to a resin composition for core-sheath type bi-component fiber that not only maintains excellent softness, but also improves tensile strength, when preparing non-woven fabric, particularly spunbond non-woven fabric

BACKGROUND ART

In general, non-woven fabric includes fabric, felt, resin-bonded non-woven fabric, needle punch, spunbond, spunlace, emboss film, wet type non-woven fabric, and the like, which are made by bonding or entangling fiber assembly by mechanical operation or mechanical, or chemical treatment such as thermal bonding without spinning and weaving, weaving, or knitting. As a specific meaning, it means bonding the contact point of randomly overlapped web and fiber with resin and using it as interlining. It is also named as bonded cloth, or bonded fabric. Such non-woven fabric may be prepared by various methods, and needle punching, chemical bonding, thermal bonding, melt bolwing, spunlace, stich bond, and spunbond methods are known.

Meanwhile, spunbond non-woven fabric using polyolefin resin as raw material has excellent feel, softness, air permeability, thermal insulation, and the like, and thus, is being widely used as filters, packaging materials, beddings, clothes, medical supplies, hygienic products, automobile interior materials, building materials, and the like. Particularly, polypropylene single fiber is processed into thermal-bonded non-woven fabric through calender bonding or air through bonding, due to the characteristic low melting point and excellent chemical resistance, and is mainly used as the surface material of hygienic products such as a diaper, a sanitary pad, and the like.

Meanwhile, unlike the existing homopolypropylene prepared using a Ziegler Natta catalyst, since homopolypropylene prepared using a metallocene catalyst has narrow molecular weight distribution, it can prepare thin and uniform fiber, and thus, can prepare low basis weight non-woven fabric having excellent strength. However, since homopolypropylene prepared using a metallocene catalyst has small content of low molecular weights due to low xylene solubles or narrow molecular weight distribution, it gives rough feel on the surface when preparing non-woven fabric.

In order to add soft feel with homopolypropylene prepared using a widely used Ziegler Natta catalyst, 4 methods including bi-component processing technology using homopolypropylene and polyethylene, mixing technology using homopolypropylene and propylene-containing polyolefin(C3-POE), mixing technology using homopolypropylene and low modulus polypropylene(LPP), and mixing technology using homopolypropylene and terpolymer polypropylene(tPP) are used.

Among them, bi-component processing technology using homopolypropylene and polyethylene is used for preparing silky soft spunbond non-woven fabric used for hygiene preparations, and mainly, high density polyethylene(HDPE) is used for a sheath and polypropylene is used for a core. The bi-component processing technology can secure bulky property because low melting point HDPE is used for a sheath and thus low temperature and pressure can be applied for a calendar when bonding during a spunbonding process, while exhibiting softness comparable to non-woven fabric blending C3-POE. However, since HDPE is applied for a sheath, tensile strength may be deteriorated.

Thus, there is a demand for the development of a novel resin composition for fiber that can not only maintain softness, but also improve tensile strength.

DETAILED DESCRIPTION OF THE PRESENT DISCLOSURE

Technical Problem

It is an object of the present invention to provide a resin composition for core-sheath type bi-component fiber that can not only maintain excellent softness, but also improve tensile strength, when preparing non-woven fabric, and non-woven fabric prepared using the same.

Technical Solution

According to one embodiment of the invention, a resin composition for core-sheath type bi-component fiber is provided, which comprises core components comprising homopolypropylene fulfilling the following requirements (i) to (v); and sheath components comprising high density polyethylene having density measured according to ASTM D1505 of 0.930 g/cm$^3$ or more:

(i) molecular weight distribution of 2.4 or less, (ii) residual stress rate of 0.05% or less, (iii) melt index, measured under load of 2.16 kg at 230° C. according to ASTM D1238, of 20 to 40 g/10 min, (iv) tacticity of 98% or more, (v) melting point of 155° C. or less.

According to another embodiment of the invention, a method for preparing a core-sheath type bi-component fiber, comprising steps of: polymerizing propylene, while introducing hydrogen gas in an amount of 300 to 500 ppm based on the total weight of propylene, in the presence of a catalyst comprising a transition metal compound of the following Chemical Formula 1, to prepare homopolypropylene fulfilling the above requirements (i) to (v); preparing a resin composition for core-sheath type bi-component fiber using the homopolypropylene as a core component, and high density polyethylene having density measured according to ASTM D1505 of 0.930 g/cm$^3$ or more as a sheath component; and melt spinning the resin composition for core-sheath type bi-component fiber to prepare fiber comprising a core comprising the homopolypropylene and a sheath comprising the high density polyethylene:

[Chemical Formula 1]

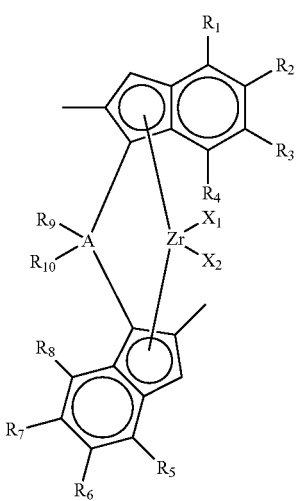

in the Chemical Formula 1,

A is carbon, silicon or germanium, $X_1$ and $X_2$ are each independently, halogen, $R_1$ and $R_5$ are each independently, $C_{6-20}$ aryl substituted with $C_{1-20}$ alkyl, $R_2$ to $R_4$ and $R_6$ to $R_8$ are each independently, hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, and $R_9$ and $R_{10}$ are identical to each other, and are $C_{2-20}$ alkyl.

According to yet another embodiment of the invention, non-woven fabric, specifically, spunbond non-woven fabric, consisting of core-sheath type bi-component fiber prepared using the above described resin composition for core-sheath type bi-component fiber, wherein the core comprises homopolypropylene fulfilling the above requirements (i) to (v), and the sheath comprises high density polyethylene having density measured according to ASTM D1505 of 0.930 g/cm³ or more.

Advantageous Effects

The resin composition for core-sheath type bi-component fiber according to the present invention comprises homopolypropylene having narrow molecular weight distribution, low residual stress rate and high tacticity as a core component, and comprises high density polyethylene as a sheath component, and thus, exhibits stable spinnability and improved strength at the same draw ratio. And, the generation of process hume is reduced, and thus, stable spinnability is secured and draw ratio can be increased. As the result, when applied for the preparation of non-woven fabric, particularly spunbond non-woven fabric, it can significantly improve tensile strength while maintaining excellent softness.

Detailed Description of the Embodiments

The terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, a resin composition for core-sheath type bi-component fiber and non-woven fabric prepared using the same according to specific embodiments of the invention will be explained.

Commonly, when preparing fiber using a bi-component resin composition, material having high melting point makes up a core component, and material having lower melting point or softening point than the core component makes up a sheath component, and in the case of spunbond non-woven fabric using polyolefin resin as raw material, HDPE having low melting point is applied for a sheath, and a Ziegler-Natta catalyst(Z/N catalyst)-based polypropylene is applied or a resin composition comprising polypropylene and ethylene-propylene copolymer is applied for a core.

In the present invention, when preparing a resin composition for core-sheath type bi-component fiber, as a core component, homopolypropylene that is prepared using a metallocene catalyst having a specific structure, and thus, compared to the existing polypropylene prepared using a Ziegler-Natta catalyst(Z/N PP), has high viscosity, narrow MWD, and reduced TVOC, and thus, may secure stable spinnability even when draw ratio is increased, and exhibit improved tensile strength, is used.

Specifically, a resin composition for core-sheath type bi-component fiber according to one embodiment of the present invention comprises (A) core components comprising homopolypropylene fulfilling the following requirements (i) to (v); and (B) sheath components comprising high density polyethylene having density measured according to ASTM D1505 of 0.930 g/cm³ or more:

(i) molecular weight distribution of 2.4 or less, (ii) residual stress rate of 0.05% or less, (iii) melt index, measured under load of 2.16 kg at 230° C. according to ASTM D1238, of 20 to 40 g/10 min, (iv) tacticity of 98% or more, (v) melting point of 155° C. or less.

Hereinafter, each component will be explained in detail.

(A) Core Components

In the resin composition for core-sheath type bi-component fiber according to one embodiment of the invention, core components comprise homopolypropylene.

In general, homopolypropylene prepared using a metallocene catalyst, used for the preparation of non-woven fabric, gives rough feel when preparing non-woven fabric, due to low content of low molecular weight structures resulting from low xylene solubles or narrow molecular weight distribution. And, in case non-woven fabric is prepared using random polypropylene instead of homopolypropylene, unlike homopolypropylene, different kinds of comonomers (for example, ethylene) enter between the main chains, and the lamellar structure of the resin is modified, and thus, although softness increases, strength is deteriorated.

Thus, in the present invention, by using homopolypropylene that is prepared using a metallocene catalyst of a specific structure, and has narrow molecular weight distribution, low residual stress rate and high tacticity, excellent fiber processability may be exhibited, and thus, when preparing non-woven fabric, tensile strength may be improved while maintaining excellent softness.

The fiber processability means that during spinning, fiber cut is not generated and fiber can be produced continuously for a long term, and during drawing, due to uniform molecular weight distribution, high ratio drawing is enabled, thereby preparing fiber having fine denier and high strength.

The homopolypropylene used in the present invention has narrow molecular weight distribution(MWD) of 2.4 or less, due to the characteristic preparation method using a metallocene catalyst described below. As such, due to narrow molecular weight distribution, when draw ratio is increased, stable spinnability may be secured and excellent fiber processability may be exhibited. More specifically, the molecular weight distribution may be 2.4 or less, and 2.0 or more, or 2.1 or more.

In the present invention, the molecular weight distribution (MWD=Mw/Mn) of the homopolypropylene can be calculated by measuring weight average molecular weight (Mw) and number average molecular weight (Mn) using GPC(gel permeation chromatography), and then, dividing the weight average molecular weight by number average molecular weight. Specifically, as the gel permeation chromatography (GPC) device, Polymer Laboratories PLgel MIX-B 300 mm length column is used, and Waters PL-GPC220 is used. Wherein, the measurement temperature is 160° C., 1,2,4-trichlorobenzene is used as a solvent, and the flow rate is 1 mL/min. A polymer sample is prepared at the concentration of 10 mg/10 mL, and then, fed in an amount of 200 μL. Using a calibration curve formed using a polystyrene standard specimen, Mw and Mn are derived. As the polystyrene standard specimens, 9 kinds having weight average molecular weight of 2,000 g/mol, 10,000 g/mol, 30,000 g/mol, 70,000 g/mol, 200,000 g/mol, 700,000 g/mol, 2,000,000 g/mol, 4,000,000 g/mol, 10,000,000 g/mol are used.

And, the homopolypropylene has low residual stress rate of 0.05% or less.

The residual stress rate can confirm fiber processability through rheological property test under an environment similar to a non-woven fabric manufacturing process, and it is measured according to the following Mathematical Formula 1, by applying large strain to homopolypropylene to conduct stress relaxation test.

Residual stress rate=$(RS_1/RS_0) \times 100$ [Mathematical Formula 1]

In the Mathematical Formula 1, $RS_0$ is residual stress at one time($t_0$) less than 0.05 seconds after applying 200% strain to the homopolypropylene, and $RS_1$ is residual stress at one time ($t_1$) between 0.05 seconds to 1.50 seconds after applying 200% strain to the homopolypropylene under 235° C.

If the residual stress rate according to the Mathematical Formula 1 is greater than 0.1%, when preparing non-woven fabric, commonly, fiber is spun at a molten state and drawn at a semi-molten state through cooling, but if residual stress is high, a tendency to shrink may increase, and thus, a possibility of generating fiber cut may increase, thus increasing fraction defective.

And, $RS_0$ in the Mathematical Formula 1 denotes residual stress immediately after applying 200% strain to homopolypropylene under 235° C. [for example, at one time($t_0$) less than 0.05 seconds]. And, $RS_1$ in the Mathematical Formula 1 denotes residual stress within about 1.5 seconds after to under the same conditions as $RS_0$ [for example at one time($t_1$) between 0.05 seconds to 2.00 seconds].

Specifically, in the Mathematical Formula 1, $t_0$ may be selected from 0.01 seconds, or 0.015 seconds, or 0.02 seconds, or 0.025 seconds, or 0.03 seconds, or 0.035 seconds, or 0.04 seconds, or 0.045 seconds. And, in the Mathematical Formula 1, $t_1$ may be selected from 0.05 seconds, or 0.10 seconds, or 0.20 seconds, or 0.30 seconds, or 0.40 seconds, or 0.50 seconds, or 0.60 seconds, or 0.70 seconds, or 0.80 seconds, or 0.90 seconds, or 1.00 seconds, or 1.10 seconds, or 1.20 seconds, or 1.30 seconds, or 1.40 seconds, or 1.50 seconds, or 1.60 seconds, or 1.70 seconds, or 1.80 seconds, or 1.90 seconds, or 2.00 seconds. Preferably, in order to easily secure effective data when measuring residual stress, it is advantage that $t_0$ is 0.02 seconds, and $t_1$ is 1.00 seconds in the Calculation Formula 1.

And, the residual stress rate of homopolypropylene is measured under an environment similar to the process condition for conducting melt blowing when preparing non-woven fabric (for example, 235° C.). The temperature of 235° C. corresponds to a temperature suitable for completely melting homopolypropylene and conducting melt blowing.

Considering fiber processability improvement effect according to the control of residual stress rate, the residual stress rate of homopolypropylene may be 0.04% or less, or 0.03% or less, and 0.005% or more, or 0.01% or more.

And, the homopolypropylene may have melt index(MI), measured under load of 2.16 kg at 230° C. according to ASTM D 1238, of 20 g/10 min or more, or 25 g/10 min or more, or 40 g/10 min or less. Wherein, the melt index may be 20 g/10 min or more so as to maintain molecular weight that can be processed into non-woven fabric, and may be 40 g/10 min or less so as to maintain basic strength of non-woven fabric.

In the present invention, the melt index of homopolypropylene may be measured under load of 2.16 kg at 230° C. according to ASTM D 1238, and is expressed as the weight (g) of polymer molten and flowing out for 10 minutes.

And, the homopolypropylene has high tacticity(or Trid tacticity) of 98% or more, more specifically, 98 to 100%. Due to such high tacticity, it may exhibit excellent rigidity when preparing non-woven fabric.

The tacticity may be measured using nuclear magnetic resonance (NMR). Specifically, peak areas of PPP (mm), PPP (mr) and PPP(rr) are calculated using $^{13}$C-NMR, and tacticity is calculated according to the following Mathematical Formula 2. Wherein, as a measuring device, 600 MHz Avance III HD NMR manufactured by Bruker is used, and each polymer is dissolved in a 1,1,2,2-tetrachloroethan solvent and analyzed at 120° C.

Tacticity (%)=$PPP(mm)/\{PPP(mm)+PPP(mr)+PPP(rr)\} \times 100$ [Mathematical Formula 2]

In the Mathematical Formula 2, PPP(mm), PPP(mr) and PPP(rr) denote peak areas derived from a methyl group of the second unit among the following three propylene units consisting of a bonding part from head to tail.

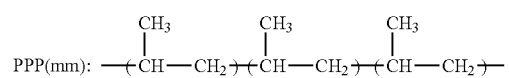

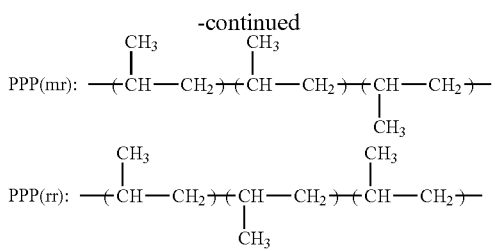
-continued

And, the $^{13}$C-NMR analysis of polypropylene may be conducted as described in U.S. Pat. No. 5,504,172. Spectrum relating to methyl carbon area(19 to 23 ppm(part per million)) may be divided into a first area(21.3 to 22.4 ppm), a second area(20.5 to 21.3 ppm) and a third area(19.5 to 20.5 ppm). Each peak in the spectrum is assigned based on the document[the journal Polymer, Volume 30 (1989), page 1350]. In the first area, among the three propylene units represented by PPP(mm), a methyl group of the second unit resonates. In the second area, among the three propylene units represented by PPP(mr), a methyl group of the second unit resonates, and a methyl group of a propylene unit(PPE-methyl group) of which adjacent units are propylene unit and ethylene unit resonates around 20.7 ppm. In the third area, among the three propylene units represented by PPP(rr), a methyl group of the second unit resonates, and a methyl group of a propylene unit(EPE-methyl group) of which adjacent unit is an ethylene unit resonates around 19.8 ppm.

And, based on the $^{13}$C-NMR analysis results, tacticity may be calculated as follows. By subtracting a peak area for error among the peak area of propylene insertion part from the total peak area of the second area and third area, a peak area based on three propylene units chain(PPP(mr) and PPP(rr)) consisting of a bonding part from head to tail is obtained. Using the calculated peak areas of PPP(mm), PPP(mr) and PPP(rr), tacticity may be calculated according to the Mathematical Formula 2.

And, the homopolypropylene has a melting point(Tm) of 155° C. or less, specifically 150° C. or less, and 140° C. or more, or 145° C. or more. Within the above range of Tm, excellent spinnability and productivity may be exhibited.

Meanwhile, in the present invention, the melting point of homopolypropylene may be measured using differential scanning calorimeter(DSC). Specifically, the temperature of a polymer sample is raised to 200° C., and then, maintained for 5 minutes, decreased to 30° C., and increased again, and the top of DSC curve is determined as a melting point. Wherein, the temperature increase and decrease speeds are respectively 10° C./min, and the result measured in the second temperature rise section is used as a melting point.

And, the shear viscosity of the homopolypropylene in the shear rate section of 500 1/s, measured using Capillary Rheometer according to ASTM D3835, is 90 to 120 Pa·s, and within the above range of shear viscosity, increased strength may be exhibited at the same draw ratio.

In the present invention, the shear viscosity of homopolypropylene may be measured using a capillary rheometer, and specifically, it may be measured under conditions of 230° C., Nozzle 0.5×27.8 mm L/D 55 according to ASTM D3835.

And, the homopolypropylene has significantly decreased TVOC content, with TVOC content based on the total weight of the polymer being 30 ppm or less, or less than 30 ppm. By exhibiting such decreased TVOC, process hume (gas resulting from oligomer decomposition) generation may be remarkably lowered during spinning, and thus, stable spinnability may be secured and draw ratio may be increased.

In the present invention, TVOC content may be measured according to VDA 277 method, by measuring gas generated after heating at 120° C. for 5 hours using Headspace Sampler-GC/FID.

The homopolypropylene having the above properties may be prepared by polymerizing propylene while introducing hydrogen gas in an amount of 300 to 500 ppm based on the total weight of propylene, in the presence of a catalyst comprising a transition metal compound of the following Chemical Formula 1, wherein optimized properties can be realized by controlling polymerization reaction conditions such as the kind of a catalyst and hydrogen input, and the like.

[Chemical Formula 1]

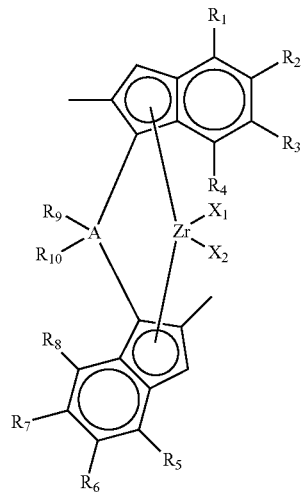

In the Chemical Formula 1,
A is carbon, silicon or germanium,
$X_1$ and $X_2$ are each independently, halogen,
$R_1$ and $R_5$ are each independently, $C_{6-20}$ aryl substituted with $C_{1-20}$ alkyl,
$R_2$ to $R_4$ and $R_6$ to $R_8$ are each independently, hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, and
$R_9$ and $R_{10}$ are identical to each other, and are $C_{2-20}$ alkyl.
Unless otherwise limited, the following terms may be defined as follows.
Halogen may be fluorine(F), chlorine(Cl), bromine(Br) or iodine (I).
A $C_{1-20}$ alkyl group may be a linear, branched or cyclic alkyl group. Specifically, a $C_{1-20}$ alkyl group may be a $C_{1-15}$ linear alkyl group; a $C_{1-10}$ linear alkyl group; a $C_{1-5}$ linear alkyl group; a $C_{3-20}$ branched or cyclic alkyl group; a $C_{3-15}$ branched or cyclic alkyl group; or a $C_{3-10}$ branched or cyclic alkyl group. More specifically, a $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, or a cyclohexyl group, and the like.
A $C_{2-20}$ alkenyl group may be a linear, branched or cyclic alkenyl group. Specifically, a $C_{2-20}$ alkenyl group may be a $C_{2-20}$ linear alkenyl group, a $C_{2-10}$ linear alkenyl group, a $C_{2-5}$ linear alkenyl group, a $C_{3-20}$ branched alkenyl group, a $C_{3-15}$ branched alkenyl group, a $C_{3-10}$ branched alkenyl group, a $C_{5-20}$ cyclic alkenyl group or a $C_{5-10}$ cyclic alkenyl group. More specifically, a $C_{2-20}$ alkenyl group may be an ethenyl group, a propenyl group, a butenyl group, a pentenyl group or a cyclohexenyl group, and the like.

A $C_{6-30}$ aryl means a monocyclic, bicyclic or tricyclic aromatic hydrocarbon. Specifically, a $C_{6-30}$ aryl may be a phenyl group, a naphthyl group or an anthracenyl group, and the like.

A $C_{7-30}$ alkylaryl group means a substituent in which one or more hydrogen atoms of aryl are substituted with alkyl. Specifically, a $C_{7-30}$ alkylaryl may be methylphenyl, ethylphenyl, n-propylphenyl, iso-propylphenyl, n-butylphenyl, iso-butylphenyl, tert-butylphenyl or cyclohexylphenyl, and the like.

A $C_{7-30}$ arylalkyl means a substituent in which one or more hydrogen atoms of alkyl are substituted with aryl. Specifically, a $C_{7-30}$ arylalkyl may be benzyl, phenylpropyl or phenylhexyl, and the like.

In the preparation method of polypropylene resin composition according to one embodiment of the invention, the step 1 is a preparation step of homopolypropylene. Specifically, it may be conducted by polymerizing propylene while introducing hydrogen in an amount of 300 to 700 ppm, in the presence of a catalyst comprising a transition metal compound of the Chemical Formula 1, and as the result, homopolypropylene having the above explained properties including molecular weight distribution of 2.4 or less is prepared.

In the step 1, the catalyst comprises a compound of the Chemical Formula 1 as a single catalyst. Thus, compared to the case of using two or more kinds of catalysts in combination, molecular weight distribution may become remarkably narrow.

In addition, since the compound of the Chemical Formula 1 comprises a divalent functional group A di-substituted with the same alkyl groups having a carbon number of 2 or more as a bridge group connecting two ligands including indenyl groups, atom size increases compared to the existing carbon bridge, and thus, a usable angle increases, and monomer access may become easy, thereby exhibiting more excellent catalytic activity.

And, since both ligands of two indenyl groups comprise phenyl groups substituted with a methyl group at the $2^{nd}$ position and substituted with an alkyl group at the $4^{th}$ position($R_1$ and $R_5$), due to inductive effect capable of providing sufficient electrons, more excellent catalytic activity may be exhibited.

And, since the compound of the Chemical Formula 1 comprises zirconium(Zr) as a center metal, compared to the case of comprising other Group 14 atoms such as Hf, it has more orbitals capable of accepting electrons, and easily bonds to monomers with higher affinity, and thus, exhibit more excellent catalytic activity improvement effect.

More specifically, in the Chemical Formula 1, $R_1$ and $R_5$ may be each independently, a $C_{6-12}$ aryl group substituted with $C_{1-10}$ alkyl, more specifically, a phenyl group substituted with a $C_{3-6}$ branched alkyl group such as a tert-butyl phenyl. And, the substitution position of the alkyl group for the phenyl group may be a $4^{th}$ position corresponding to a para position to $R_1$ or $R_5$ bound to the indenyl group.

And, in the Chemical Formula 1, $R_2$ to $R_4$ and $R_6$ to $R_8$ may be each independently, hydrogen, and $X_1$ and $X_2$ may be each independently, chloro.

And, in the Chemical Formula 1, A may be silicon, and the substituents of A, $R_9$ and $R_{10}$, may be identical to each other so as to increase solubility and improve support efficiency, and may be each independently, a $C_{2-10}$ alkyl group, specifically, a $C_{2-4}$ linear alkyl group such as ethyl, n-propyl, n-butyl, more specifically ethyl. In case the substituents of the bridge, $R_9$ and $R_{10}$, are each independently a methyl group, solubility is poor when preparing a supported catalyst, and thus, support reactivity may be lowered.

Representative examples of the compound represented by the Chemical Formula 1 are as follows:

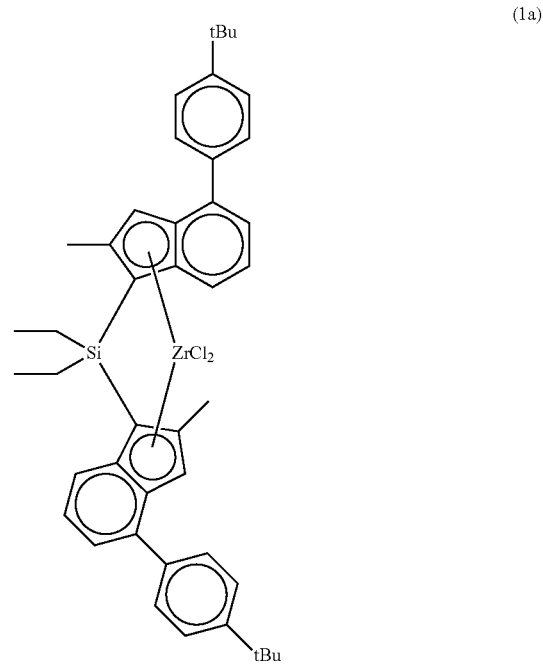

(1a)

The compound of the Chemical Formula 1 may be synthesized using known reactions, and for more detailed synthesis method, preparation examples described below may be referred to.

Meanwhile, the compound of the Chemical Formula 1 may be used as a single component, or it may be used in the state of a support catalyst that is supported on a carrier. When used in the state of a supported catalyst, particle shape and bulk density of prepared polymer may be excellent, and it may be appropriately used for the conventional slurry polymerization, bulk polymerization, or gas phase polymerization process.

As the carrier, carriers comprising hydroxyl groups or siloxane groups on the surface may be used, and preferably, carriers dried at high temperature to remove moisture on the surface, and comprising highly reactive hydroxyl groups and siloxane groups may be used. Specific examples of the carrier may include silica, alumina, magnesia, silica-alumina, silica-magnesia, and the like, and commonly, further comprise oxide, carbonate, sulfate and nitrate components such as $Na_2O$, $K_2CO_3$, $BaSO_4$, and $Mg(NO_3)_2$, and the like. Among them, in the case of silica, since the silica carrier and the functional group of the metallocene compound are chemically bonded to support, catalysts are hardly released from the carrier surface during a propylene polymerization process, and thus, when preparing homopolypropylene by slurry or gas phase polymerization, fouling wherein polymer particles are adhered to the wall surface of a reactor or to each other may be minimized.

In case the compound of the Chemical Formula 1 is supported on a carrier, the weight ratio of the compound of the Chemical Formula 1 and the carrier may be 1:1 to 1:1000. When the carrier and the compound of the Chemical Formula 1 are included at the above weight ratio, appropriate supported catalyst activity may be exhibited, and it may be advantageous in terms of catalytic activity maintenance and economical efficiency. More specifically, the weight ratio of the compound of the Chemical Formula 1 and the carrier may be 1:10 to 1:30, more specifically 1:15 to 1:20.

And, the catalyst composition may further comprise a cocatalyst so as to achieve high activity and improve process stability.

The cocatalyst may comprise one or more selected from the group consisting of a compound represented by the following Chemical Formula 2, a compound represented by the following Chemical Formula 3, and a compound represented by the following Chemical Formula 4:

$$[Al(R_{11})-O]_m-$$ [Chemical Formula 2]

In the Chemical Formula 2,
$R_{11}$ may be identical to or different from each other, and each independently, halogen; $C_{1-20}$ hydrocarbon; or $C_{1-20}$ hydrocarbon substituted with halogen;
m is an integer of 2 or more;

$$J(R_{12})_3$$ [Chemical Formula 3]

In the Chemical Formula 3,
$R_{12}$ may be identical to or different from each other, and each independently, halogen; $C_{1-20}$ hydrocarbon; or $C_{1-20}$ hydrocarbon substituted with halogen;
J is aluminum or boron;

$$[E-H]^+[ZA_4]^- \text{ or } [E]^+[ZA_4]^-$$ [Chemical Formula 4]

In the Chemical Formula 4,
E is neutral or cationic Lewis base;
H is a hydrogen atom;
Z is Group 13 element;
A may be identical to or different from each other, and each independently, a $C_{6-20}$ aryl group or a $C_{1-20}$ alkyl group of which one or more hydrogen atoms are unsubstituted or substituted with halogen, $C_{1-20}$ hydrocarbon, alkoxy or phenoxy.

Examples of the compound represented by the Chemical Formula 2 may include alkylaluminoxane compounds, such as methylaluminoxane, ethylaluminoxane, isobutylaluminoxane or butylaluminoxane, and the like, and one or a mixture of two or more may be used.

Examples of the compound represented by the Chemical Formula 3 may include trimethyl aluminum, triethyl aluminum, triisobutyl aluminum, tripropyl aluminum, tributyl aluminum, dimethyl chloroaluminum, triisopropyl aluminum, tri-s-butyl aluminum, tricyclopentyl aluminum, tripentyl aluminum, triisopentyl aluminum, trihexyl aluminum, trioctyl aluminum, ethyldiethyl aluminum, methyldiethyl aluminum, triphenyl aluminum, tri-p-tollyl aluminum, dimethyl aluminum methoxide, dimethyl aluminum ethoxide, trimethyl boron, triethyl boron, triisobutyl boron, tripropyl boron, tributyl boron, and the like, and one or a mixture of two or more may be used. More specifically, one or more compounds selected from trimethylaluminum, triethylaluminum, or triisobutylaluminum may be used.

And, examples of the compound represented by the Chemical Formula 4 may include triethylammonium tetraphenylboron, tributylammonium tetraphenylboron, trimethylammonium tetraphenylboron, tripropylammonium tetraphenylboron, trimethylammonium tetra(p-tollyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tollyl)aluminum, tripropylammonium tetra(p-tollyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, triphenylphosphonium tetraphenylaluminum, trimethylphosphonium tetraphenylaluminum, tripropylammonium tetra(p-tollyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, and one or a mixture of two or more may be used.

More specifically, the cocatalyst may be an alkylaluminoxane-based cocatalyst.

Since the alkylaluminoxane-based cocatalyst comprises metal element that stabilizes the transition metal compound of the Chemical Formula 1, acts as Lewis acid, and forms a bond through Lewis acid-base interaction with the functional group introduced in the bridge group of the transition metal compound of the Chemical Formula 1, it may further increase catalytic activity.

In case the cocatalyst is further included, the weight ratio of the compound of the Chemical Formula 1 and the cocatalyst may be 1:1 to 1:20. When the cocatalyst and the compound of the Chemical Formula 1 are included at the above weight ratio, appropriate supported catalyst activity may be exhibited and it may be advantageous in terms of maintenance of catalytic activity and economical efficiency. More specifically, the weight ratio of the compound of the Chemical Formula 1 and the cocatalyst may be 1:5 to 1:20, more specifically 1:5 to 1:15.

The catalyst composition having the above construction may be prepared by a preparation method comprising steps of supporting a cocatalyst compound on a carrier, and supporting the compound represented by the Chemical Formula 1 on the carrier, wherein the support sequence of the cocatalyst and the compound of the Chemical Formula 1 may vary. However, considering the influence of a supported catalyst having a structure determined according to the support sequence on the catalytic activity and process stability in the preparation process of polypropylene, the compound of the Chemical Formula 1 may be supported after cocatalyst is supported, so as to realize higher catalytic activity and excellent process stability.

Meanwhile, a polymerization reaction for the preparation of homopolypropylene may be conducted by a continuous polymerization process, and for example, various polymerization processes known as a polymerization reaction of olefin monomers including continuous solution polymerization, bulk polymerization, suspension polymerization, slurry polymerization, or emulsion polymerization may be used. Particularly, a continuous bulk-slurry polymerization process may be used so as to obtain uniform molecular weight distribution and commercially produce a product.

And, the polymerization reaction may be conducted at a temperature of 40° C. or more, or 60° C. or more, or 70° C. or more, and 110° C. or less or 100° C. or less, and in case pressure condition is further controlled, it may be conducted under pressure of 1 kgf/cm$^2$ or more, or 30 kgf/cm$^2$ or more, and 100 kgf/cm$^2$ or less, or 50 kgf/cm$^2$ or less.

And, the polymerization reaction is conducted while introducing hydrogen gas.

Wherein, the hydrogen gas performs a function for activating non-active site of the metallocene catalyst and causing a chain transfer reaction, thereby controlling molecular weight. The metallocene compound of the present invention has excellent hydrogen reactivity, and thus, by the control of the amount of the hydrogen gas during the polymerization process, homopolypropylene having desired molecular weight and melt index may be effectively obtained.

The hydrogen gas may be introduced in an amount of 300 ppm or more, or 350 ppm or more, and 500 ppm or less, or 490 ppm or less, based on the total weight of propylene monomers. By controlling the amount of hydrogen gas within the above range, molecular weight distribution and flowability of prepared homopolypropylene may be controlled within desired ranges while exhibiting sufficient catalytic activity, and thus, copolymer having appropriate properties according to use may be prepared. More specifically, since the compound of the Chemical Formula 1 has very excellent hydrogen reactivity, as the amount of hydrogen gas is increased, chain transfer reactions are activated, and thus, homopolypropylene having decreased molecular weight and high melt index may be obtained. If the amount of hydrogen gas used is less than 300 ppm, melt index may be significantly lowered and processability may be deteriorated. And if it is greater than 500 ppm, melt index may become excessively high and the properties of non-woven fabric may be deteriorated.

And, in the polymerization reaction, the catalyst may be used while dissolved or diluted in a C5-12 aliphatic hydrocarbon solvent suitable for the polymerization process of propylene monomers, such as pentane, hexane, heptanes, nonane, decane and isomers thereof, an aromatic hydrocarbon solvent such as toluene, benzene, or a hydrocarbon solvent substituted with a chlorine atom such as dichloromethane or chlorobenzene. Wherein, the solvent may be treated with a small amount of alkylaluminum to remove a small amount of water or air that may act as catalytic poison.

According to the preparation method of homopolypropylene, the transition metal compound of the Chemical Formula 1 is used as a catalytically active component, thereby improving productivity with high conversion rate, and through the control of hydrogen input amount, prepared polymer has narrow molecular weight distribution, low residual stress rate and high tacticity, thus securing excellent fiber processability and decreasing modulus during the preparation process of non-woven fabric, thereby effectively preparing high strength high softness non-woven fabric.

In the resin composition according to one embodiment of the invention, the core components may further comprise one or more additives for improving properties required according to the use of the resin composition, specifically, a nucleating agent(for example, benzylidene sorbitol, methylbenzylidene sorbitol, ethylbenzylidene sorbitol, and the like), an antioxidant(tetrakis(methylene (3,5-di-t-butyl-4-hydroxy)hydrosilylate), tris (2,4-di-t-butylphenol)phosphate, and the like), a catalytic neutralization agent(calcium stearate, hydrotalcite, and the like), pigment, a dispersant, a weathering agent, an antistatic agent, a UV stabilizer, a slip agent, an antiblocking agent, talc, or an MI increasing agent (bis(t-butylperoxyisopropyl)benzene), in addition to the above described homopolypropylene. The content of the additives may be appropriately controlled in a range within which the object of the invention is not hindered, and specifically, the additives may be included in the content of 0.01 to 5 wt %, based on the total weight of the core components.

(B) Sheath Components

Meanwhile, the resin composition for fiber according to one embodiment of the invention comprises high density polyethylene as sheath components.

The high density polyethylene has density measured according to ASTM D1505 of 0.930 g/cm$^3$ or more. However, if density is excessively high, crystallization degree may rapidly increase, and the properties of fiber and non-woven fabric may be deteriorated, and more specifically, it has density of 0.930 g/cm$^3$ or more, or 0.940 g/cm$^3$ or more, and 0.970 g/cm$^3$ or less, or 0.958 g/cm$^3$ or less.

The heating, melting behaviors of high density polyethylene, namely, melting properties are very important for forming high density polyethylene polymer. In general, as MI(melt index) increase, formability is improved, but impact resistance is deteriorated. Thus, in case MI is increased so as to improve formability, commonly, a short chain branched structure is formed through copolymerization to decrease density, thereby preventing deterioration of impact resistance. However, such ethylene density decrease deteriorates rigidity of polymer, and thus, the application is limited. And, if MI is decreased, impact resistance and chemical resistance are improved, but melt flowability is deteriorated, and thus, formability is significantly deteriorated.

In this regard, high density polyethylene used in the present invention has a melt index(melt index; MI) of 10 g/10 min or more, or 20 g/10 min or more, or 30 g/10 min or more, and 40 g/10 min or less, or 38 g/10 min or less, or 35 g/10 min or less, measured under load of 2.16 kg at 230° C. according to ASTM D 1238. Within the above range of MI, melt viscosity (Tension) of the resin composition may be improved, and when used in combination with the core components comprising homopolypropylene, strength of fiber may be further improved.

In the present invention, the melt index of high density polyethylene may be measured under load of 2.16 kg at 230° C. according to ASTM D1238, and is expressed as the weight of polymer molten and flowing out for 6 minutes.

The high density polyethylene may have a melting point of 120° C. or more and 135° C. or less. Within the above range of melting point, more excellent fiber processability may be exhibited.

In the present invention, the melting point of high density polyethylene may be measured using differential scanning calorimeter(DSC). Specifically, the temperature of high density polyethylene is raised to 200° C., and then, maintained for 5 minutes, decreased to 30° C., and increased again, and the top of DSC(Differential Scanning Calorimeter, manufactured by TA Instruments) curve is determined as a melting point. Wherein, the temperature increase and decrease speeds are respectively 10° C./min, and the result measured in the second temperature rise section is used as a melting point.

And, the high density polyethylene may be ethylene homopolymer or copolymer of ethylene and alpha olefin monomers, and the alpha olefin monomers may be one or more selected from the group consisting of propylene, 1-butene, 1-pentene, 4-methyl-1-pentene, 1-hezene, 1-heptene, 1-octene, 1-decene, 1-undecene, 1-dodecene, 1-tetradecene, 1-hexadecene and 1-eicosene. In case the high density polyethylene is copolymer of ethylene and alpha olefin monomers, the content of the alpha olefin monomers may be 0.1 wt % or more, or 1 wt % or more, and 20 wt % or less, or 10 wt % or less.

And, the sheath components may also further comprise one or more additives for improving properties required according to the use of the resin composition, in addition to the above described high density polyethylene. Wherein the additives that can be included are as explained in the core components. The content of the additives may be appropriately controlled in a range within which the object of the invention is not hindered, and specifically, may be included in the content of 0.01 to 5 wt %, based on the total weight of the components.

The resin composition for fiber according to one embodiment of the invention having the above described composition may comprise the core components and sheath components at a weight ratio of 70:30 to 90:10, or at a weight ratio of 70:30 or more, or 80:20 or more, and 90:10 or less, or 85:15 or less. Within the above weight ratio range, excellent fiber processability may be exhibited, and thus, excellent strength may be exhibited when draw ratio is increased. Thus, the resin composition for fiber may be particularly useful for the preparation of non-woven fabric, particularly spunbond non-woven fabric.

According to another embodiment of the invention, non-woven fabric, specifically spunbond nonwoven fabric, consisting of the core-sheath type bi-component fiber prepared using the above explained resin composition for fiber is provided.

The fiber may be prepared by a method comprising steps of: polymerizing propylene while introducing hydrogen gas in an amount of 300 to 500 ppm based on the total weight of propylene, in the presence of a catalyst comprising a transition metal compound of the following Chemical Formula 1, to prepare the above described homopolypropylene; preparing a resin composition for core-sheath type bi-component fiber using the homopolypropylene as a core component, and high density polyethylene having density measured according to ASTM D1505 of 0.930 g/cm³ or more as a sheath component; and melt spinning the resin composition for core-sheath type bi-component fiber to prepare fiber comprising a core comprising the homopolypropylene and a sheath comprising the high density polyethylene. Wherein, the homopolypropylene included in the resin composition for core-sheath type bi-component fiber and the preparation method, and the high density polyethylene are as explained above.

In the preparation method, the melt spinning process may be conducted by a common method except using the above described resin composition.

Specifically, it may be conducted in the sequence of spinning each component of core and sheath in a molten state to prepare filament(step 1); cooling the spun filament at the air flow of 25 to 35 rpm under temperature condition of 10 to 20° C. (step 2); and binding the cooled filaments with each other to form non-woven fabric(step 3).

During the spinning process of step 1, one or plural outlets may be used, and it is preferable to simultaneously use plural outlets considering preparation efficiency. And, the temperature for melting may be appropriately controlled at higher temperature than the melting point of polymer.

And, the step 2 may be conducted by cooling the filament spun through the melt spinning in the step 1 at the air flow of 25 to 35 rpm and under temperature condition of 10 to 20° C. According to the cooling conditions, the properties of the finally prepared non-woven fabric may be controlled even if the same resin is used.

The cooling process may be conducted by introducing cooling air during recovery of filament with a collector after the filament is spun from the outlet. Wherein, by controlling the air flow and temperature of the cooling air, the cooling conditions may be controlled. More specifically, the air flow of the cooling air may be 26 rpm or more, or 30 rpm or more, and 35 rpm or less, or 32 rpm or less, and the temperature of the cooling air(Cooling Air Temp.) may be 15° C. or more, and 20° C. or less.

The fiber prepared by the above method has a core-sheath type structure wherein the core comprises the above described homopolypropylene, and the sheath comprises the above described high density polyethylene.

And, the non-woven fabric prepared by the above method is a kind of non-woven fabric made by blowing fiber coming out from a spinning nozzle on a driving conveyer to form a long fiber layer on the conveyer, and is also named as long fiber non-woven fabric because it uses filament.

And, the non-woven fabric may be spunbond non-woven fabric prepared by a melt spun process wherein the resin composition is molten and extruded into an extra fine denier fiber web.

The non-woven fabric has excellent drawing property, maintains high strength, and can give soft feel and softness compared to the existing non-woven products. Specifically, the non-woven fabric or spunbond non-woven fabric may have machine direction(MD) tensile strength of 40 N/5 cm or more, or 44N/5 cm or more, and 60N/5 cm or less, and cross direction(CD) tensile strength of 5N/5 cm or more, and 30 N/5 cm or less, measured under conditions of non-woven fabric basis weight of 20 to 25 g/m² according to ASTM D-5035.

And, the kinetic coefficient(KINETIC OCF) measured according to ASTM D1894 may be 0.034 or less.

And, in order to secure excellent softness, Handle-O-meter measurement value in the machine direction(MD) of the non-woven fabric may be 15.0 g or less, or 14.0 g or less, and Handle-O-meter measurement value in the cross direction(CD) of the non-woven fabric may be 10.0 g or less, or 9.0 g or less. When the Handle-O-meter measurement values are maintained in the above ranges, the spunbond non-woven fabric may secure excellent softness so that rough properties may be reduced and soft properties may be realized. The Handle-O-meter is measured under condition of non-woven fabric basis weight of 20 to 25 g/m².

Particularly, the non-woven fabric, or spunbond fabric according to one embodiment of the invention is characterized by simultaneously fulfilling the above explained Handle-O-meter measurement values and tensile strength ranges, and thus, can maintain high strength and realize softer property than the existing products.

Hereinafter, preferable examples are presented for better understanding of the present invention. However, these examples are presented only as the illustrations of the invention, and the scope of the invention is not limited thereby.

Preparation Example 1: Preparation of a Supported Catalyst

Step 1) Preparation of (diethylsilane-diyl)-bis(2-methyl-4-(4-tert-butyl-phenyl)indenyl)silane 2-methyl-4-tert-butyl-phenylindene(20.0 g) was dissolved in a mixed solution of toluene/THF (toluene/

THF=10/1 volume ratio, 220 mL), and then, a n-butyl-lithium solution(2.5 M, hexane solvent, 22.2 g) was slowly added dropwise, and the solution was stirred at room temperature for a day. Thereafter, diethyldichlorosilane (6.2 g) was slowly added dropwise to the mixed solution at −78° C., and the solution was stirred for about 10 minutes, and then, stirred at room temperature for a day. Thereafter, water was added to separate an organic layer, and then, the solvent was distilled under reduced pressure to obtain (diethylsilane-diyl)-bis(2-methyl-4-(4-tert-butyl-phenyl)indenyl)silane.

Step 2) [(diethylsilane-diyl)-bis(2-methyl-4-(4-tert-butyl-phenyl)indenyl)]zirconium Dichloride (Diethylsilane-diyl)-bis((2-methyl-4-(4-tert-butyl-phenyl)indenyl)silane prepared in the step 1 was dissolved in a mixed solution of toluene/THF (toluene/THF=5/1 weight ratio, 120 mL), and then, a n-butyllithium solution(2.5 M, hexane solvent, 22.2 g) was slowly added dropwise at −78° C., and then, the solution was stirred at room temperature for a day. Zirconium chloride(8.9 g) was diluted in toluene(20 mL), and then, slowly added dropwise to the reaction solution at −78° C., and the solution was stirred at room temperature for a day. The solvent of the reaction solution was removed under reduced pressure, dichloromethane was introduced to filter, and then, the filtrate was distilled under reduced pressure and removed. By recrystallization with toluene and hexane, high purity rac-[(diethylsilane-diyl)-bis((2-methyl-4-tert-butyl-phenylindenyl)]zirconium dichloride(10.1 g, 34%, rac:meso=20:1) was obtained.

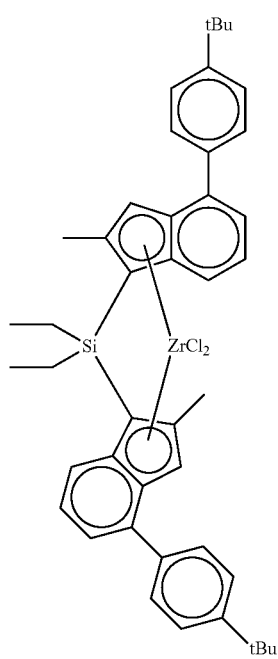

(1a)

Step 3: Preparation of a Supported Catalyst

Into a 3 L reactor, 100 g of silica and 10 wt % methylaluminoxane(670 g) were introduced and reacted at 90° C. for 24 hours. After precipitation, the upper layer part was removed and the remainder washed with toluene twice. The ansa-metallocene compound rac-[(diethylsilane-diyl)-bis(2-methyl-4-(4-tert-butyl-phenyl-indenyl)]zirconium dichloride (5.8 g) prepared in the step 2 was diluted in toluene and added to the reactor, and then, reacted at 70° C. for 5 hours. When precipitation was finished after the reaction was completed, the upper layer solution was removed and the remaining reaction product was washed with toluene and washed with hexane again, and vacuum dried to obtain 150 g of silica supported metallocene catalyst in the form of solid particles.

Comparative Preparation Example 1

A silica supported metallocene catalyst was obtained by the same method as Preparation Example 1, except that [6-(tert-butoxy)hexyl]methylsilanediyl-bis[2-methyl-1H-4-(4-tert-butylphenyl)indenyl] zirconium dichloride was used as a transition metal compound.

Comparative Preparation Example 2

A silica supported metallocene catalyst was obtained by the same method as Preparation Example 1, except that a compound of the following structure was used as a transition metal compound.

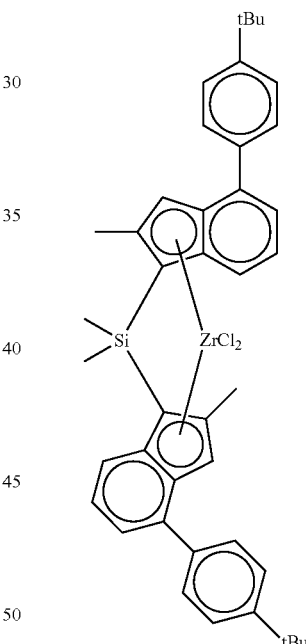

Example 1-1

Bulk-slurry polymerization of propylene was progressed using continuous two loop reactors, in the presence of the silica supported metallocene catalyst prepared in Preparation Example 1.

Wherein, triethylaluminum(TEAL) and hydrogen gas were respectively introduced in the contents described in the following Table 1 using a pump, and for the bulk-slurry polymerization, the silica supported metallocene catalyst prepared in Preparation Example 1 was used in the form of a mud catalyst mixed with oil and grease such that the content became 30 wt %. The temperature of the reactor was 70° C., and the reactor was operated such that output per hour became approximately 40 kg.

Specific reaction conditions of the polymerization process of Example 1-1 are as described in the following Table 1, and through the polymerization process, homopolypropylene was prepared.

Examples 1-2 to 1-4

Homopolypropylene was prepared by the same method as Example 1-1, except that the process was conducted under conditions described in the following Table 1.

Comparative Example 1-1

Commercially available H7700™ (manufactured by LG Chem) was used as Z/N homopolypropylene.

Comparative Example 1-2 to 1-3

Homopolypropylene was prepared by the same method as Example 1-1, except that the process was conducted under conditions described in the following Table 1.

Comparative Example 1-4

Homopolypropylene was prepared by the same method as Example 1-1, except that the catalyst prepared in Comparative Preparation Example 1 was used, and the process was conducted under conditions described in the following Table 1.

Comparative Example 1-5

Homopolypropylene was prepared by the same method as Example 1-1, except that the catalyst prepared in Comparative Preparation Example 2 was used, and the process was conducted under conditions described in the following Table 1.

(1) Melt index(MI) (g/10 min): measured under load of 2.16 kg at 230° C. according to ASTM D1238, and expressed as the weight(g) of polymer molten and flowing out for 10 minutes.

(2) Tacticity) (%): By analyzing polymers of Examples and Comparative Examples by $^{13}$C-NMR, peak areas of PPP (mm), PPP (mr) and PPP(rr) were obtained, and tacticity was calculated according to the following Mathematical Formula 2. Wherein, 600 MHz Avance III HD NMR manufactured by Bruker was used as a measuring device, and each copolymer was dissolved in the solvent of 1,1,2,2-tetrachloroethane and analyzed at 120° C.

$$\text{Tacticity (\%)} = PPP(mm)/\{PPP(mm)+PPP(mr)+PPP(rr)\} \times 100 \quad \text{[Mathematical Formula 2]}$$

(3) Melting point(Tm) (C): The temperature of polymer was increased to 200° C., and then, maintained for 5 minutes, decreased to 30° C., and increased again, and the top of DSC(Differential Scanning Calorimeter, manufactured by TA Instruments) curve was determined as a melting point. Wherein the temperature increase and decreased speeds were respectively 10° C./min, and the result measured in the second temperature rise section was used as a melting point.

(4) Molecular weight distribution(MWD): Weight average molecular weight (Mw) and number average molecular weight (Mn) were measured using GPC (gel permeation chromatography), and molecular weight distribution(MWD) was calculated by dividing weight average molecular weight by number average molecular weight.

Specifically, as GPC device, Polymer Laboratories PLgel MIX-B 300 mm length column was used, and Waters PL-GPC220 was used. Wherein, the measurement temperature was 160° C., 1,2,4-trichlorobenzene was used as a solvent, and the flow rate was 1 mL/min. The polymer samples prepared in Examples and Comparative Examples were respectively prepared at the concentration of 10 mg/10 mL, and then, fed in an amount of 200 μL.

TABLE 1

| | Example | | | | Comparative Example | | | | |
|---|---|---|---|---|---|---|---|---|---|
| | 1-1 | 1-2 | 1-3 | 1-4 | 1-1 | 1-2 | 1-3 | 1-4 | 1-5 |
| Catalyst | Preparation Example 1 | Preparation Example 1 | Preparation Example 1 | Preparation Example 1 | Z/N | Preparation Example 1 | Preparation Example 1 | Comparative Preparation Example 1 | Comparative Preparation Example 2 |
| Catalyst amount (g/hr) | 1 | 1 | 1 | 1 | — | 1 | 1 | 1 | 1 |
| Pressure (kg/cm$^2$) | 35 | 35 | 35 | 35 | — | 35 | 35 | 35 | 35 |
| Propylene input (kg/h) | 40 | 40 | 40 | 40 | — | 40 | 40 | 40 | 40 |
| TEAL input (ppm) | 50 | 50 | 50 | 50 | — | 50 | 50 | 50 | 50 |
| Polymerization temperature (° C.) | 70 | 70 | 70 | 70 | — | 70 | 70 | 70 | 70 |
| Hydrogen input (ppm) | 490 | 450 | 400 | 350 | — | 540 | 100 | 400 | 370 |

Experimental Example 1: Evaluation of Homopolypropylene

For the homopolypropylenes prepared in Examples and Comparative Examples, the properties were evaluated as follows. The results were shown in the following Table 2.

Using a calibration curve formed using a polystyrene standard specimen, Mw and Mn were derived. As the polystyrene standard specimens, 9 kinds having weight average molecular weight of 2,000 g/mol, 10,000 g/mol, 30,000 g/mol, 70,000 g/mol, 200,000 g/mol, 700,000 g/mol, 2,000,000 g/mol, 4,000,000 g/mol, 10,000,000 g/mol were used.

(5) Residual stress rate (%): For the homopolypropylenes according to Examples and Comparative Examples, each sample was taken, and 200% strain was applied at 235° C., and then, change in residual stress was measured for 10 minutes.

For the measurement of residual stress, Discovery Hybrid Rheometer (DHR) from TA Instruments was used, and the sample was sufficiently loaded between the upper and lower plates having a diameter of 25 mm and dissolved at 235° C., and then, a gap was fixed to 1 mm to measure.

Based on the data of measured residual stress, residual stress rate(RS %) was calculated according to the following Mathematical Formula 1.

Residual stress rate=$(RS_1/RS_0) \times 100$    [Mathematical Formula 1]

In the Mathematical Formula 1, $RS_0$ is residual stress at 0.02 seconds($t_0$) after applying 200% strain to the sample, and $RS_1$ is residual stress at 1.00 seconds($t_1$) after applying 200% strain to the sample at 235° C.

(6) Shear Viscosity @500 (1/s) (Pa·s): Using capillary rheometer as measuring device, shear viscosity was measured according to ASTM D3835 under the following conditions.

<Measurement Conditions>
230° C., Nozzle 0.5×27.8 mm L/D 55

(7) mPP/Z.N Shear Viscosity rate @500(1/s): Since shear viscosity may be changed according to measuring device, it was indicated as increase and decrease rate. Specifically, the rate of the shear viscosity of each homopolypropylene(mPP) of Examples 1-1 to 1-4, and Comparative Examples 1-2 to 1-5, to the shear viscosity of the homopolypropylene(Z.N) of Comparative Example 1-1 prepared using a Ziegler-Natta catalyst, measured in (6), was calculated.

(8) Total volatile organic compounds(TVOC) content: According to VDA 277 method, gas generated after heating at 120° C. for 5 hours was measured using Headspace Sampler-GC/FID.

homopolypropylene of Comparative Example 1-2 wherein an excessive amount of hydrogen is introduced during the polymerization reaction, high MI greater than 40 g/10 min is exhibited, and thus, strength is significantly lowered when draw ratio is increased.

And, in the case of the homopolypropylene of Comparative Example 1-3 wherein excessively low content of hydrogen is introduced, residual stress rate and shear viscosity significantly increase. Thus, it can be expected that fiber cut may be generated and fraction defective may increased during fiber spinning.

The homopolypropylene of Comparative Example 1-4 prepared using a metallocene catalyst having a different structure has wide MWD, and thus, it can be expected that when draw ratio is increased, spinnability may be deteriorated, and fiber processability may be also deteriorated.

And, in the case of the homopolypropylene of Comparative Example 1-5 prepared using a catalyst having the same central backbone structure except that substituents in the bridge group are different, tacticity of prepared polymer is deteriorated, and thus, it can be easily expected that strength may be significantly deteriorated when preparing non-woven fabric.

Preparation of Non-Woven Fabric

Example 2-1

Using the homopolypropylene prepared in Example 1-1 as a composition for forming a core, and using high density polyethylene (density (measured according to ASTM D1505)=0.954~0.956 g/cm$^3$, MI(measured according to ASTM D 1238 at 230° C. under load of 2.16 kg)=10~40 g/10 min, melting point=120~135° C.) as a composition for forming a sheath, non-woven fabric was prepared by a bi-component spunbond method under conditions described in the following Table 3.

TABLE 2

| | Example | | | | Comparative Example | | | | |
|---|---|---|---|---|---|---|---|---|---|
| | 1-1 | 1-2 | 1-3 | 1-4 | 1-1 | 1-2 | 1-3 | 1-4 | 1-5 |
| MI (g/10 mim) | 40 | 35 | 30 | 25 | 32 | 50 | 10 | 30 | 25 |
| Tacticity (%) | 98 | 98 | 98 | 98 | 98 | 98 | 98 | 98 | 96 |
| Tm (° C.) | 150 | 150 | 150 | 150 | 160 | 150 | 150 | 152 | 147 |
| MWD | 2.4 | 2.4 | 2.4 | 2.4 | 3.0 | 2.4 | 2.4 | 3.0 | 2.4 |
| Residual stress rate (%) | 0.02 | 0.03 | 0.04 | 0.05 | 0.15 | 0.008 | 0.2 | 0.13 | 0.05 |
| Shear Viscosity @500 (1/s) (Pa · s) | 97 | 105 | 111 | 120 | 97 | 80 | 140 | 99 | 122 |
| mPP/Z.N Shear Viscosity rate @500 (1/s) | 0.94~1.05 | 1.03~1.13 | 1.09~1.19 | 1.18~1.28 | — | 0.77~0.87 | 1.4~1.7 | 0.9~1.05 | 1.20~1.30 |
| TVOC (ppm) | <30 | <30 | <30 | <30 | 200 | <30 | <30 | <30 | <30 |

It can be seen that the homopolypropylene of Examples 1-1 to 1-4 prepared using a metallocene catalyst according to the present invention exhibits narrow MWD and low residual stress, and thus, can be drawn at increased draw ratio, and also exhibits excellent strength.

It can be seen that in the case of the polymer of Comparative Example 1-1 prepared using a Z/N catalyst, wide MWD and high residual stress are exhibited, and thus, drawing property is poor and it is difficult to improve strength.

And, it can be seen that even if the same metallocene catalyst as in the present invention is used, in the case of the Specifically, a masterbatch of 98 wt % of the resin composition and 2 wt % of a softening agent of cis-13-docosenoamide(Sigma-Aldrich) was prepared using 25 mm twin-screw extruder, and then, it was pelletized. Subsequently, using 31 mm Brabender conical twin screw extruder, the molten masterbatch pellet was fed to a melt pump(65 rpm), and then, fed to a melt spun die with a width of 25 cm having outlets(10 outlets/cm) and outlet diameter of 381 μm, and the masterbatch pellet was extruded into an extra fine denier fiber web according to the process described in the document [Report No. 4364 of the Naval Research Laboratories, published May 25, 1954 entitled "Manufacture of Superfine Organic Fibers" by Wente, Van. A. Boone, C. D., and Fluharty, E. L.], except that the process was conducted under conditions described in the following Table 3.

Wherein, the melting temperature was 235° C., the screw speed was 120 rpm, the die was maintained at 235° C., air temperature and pressure were respectively 300° C. and 60 kPa(8.7 psi), processing speed was 5.44 kg/hr, and the distance between collector/die was 15.2 cm.

Examples 2-2 to 2-4

Non-woven fabric was prepared by the same method as Example 2-1, except that homopolypropylenes of Example 1-2 to 1-4 were respectively used, and the process was conducted under conditions described in the following Table 3.

Comparative Examples 2-1 and 2-2

Non-woven fabric was prepared by the same method as Example 2-1, except that homopolypropylene of Comparative Example 1-1 was used, and the process was conducted under conditions described in the following Table 3.

Comparative Example 2-3

The homopolypropylene of Comparative Example 1-1, and ethylene-propylene copolymer having propylene content of 16 wt % ((C3-POE; VIstamax 6202™ (ExxonMobil)), density=0.863 g/cm³, MI=20 g/10 min) were mixed at a weight ratio of 80:20 to prepare a resin composition, and non-woven fabric was prepared using the same by a spunbond method.

Comparative Example 2-4

Non-woven fabric was prepared by the same method as Example 2-1, except that homopolypropylene of Comparative Example 1-2 was used, and the process was conducted under conditions described in the following Table 3.

Comparative Examples 2-5 and 2-6

Non-woven fabric was prepared by the same method as Example 2-4, except that homopolypropylenes of Comparative Examples 1-3 or 1-4 were respectively used, and the process was conducted under conditions described in the following Table 3.

TABLE 3

|  | Example | | | | Comparative Example |
| --- | --- | --- | --- | --- | --- |
|  | 2-1 | 2-2 | 2-3 | 2-4 | 2-1 |
| Resin composition (weight ratio) | HDPE/mPP (20:80) | HDPE/mPP (20:80) | HDPE/mPP (20:80) | HDPE/mPP (20:80) | HDPE/Z/N PP (20:80) |
| Kind of homopolypropylene | Example 1-1 | Example 1-2 | Example 1-3 | Example 1-4 | Comparative Example 1-1 |
| Form | Bicomponent | Bicomponent | Bicomponent | Bicomponent | Bicomponent |
| Cooling Air/ Suction Blower (rpm) | 30/30 | 30/30 | 30/30 | 30/30 | 22/23 |
| Cooling Air Temp (° C.) | 14 | 14 | 14 | 14 | 12 |

|  | Comparative Example | | | | |
| --- | --- | --- | --- | --- | --- |
|  | 2-2 | 2-3 | 2-4 | 2-5 | 2-6 |
| Resin composition (weight ratio) | HDPE/Z/N PP (20:80) | Z/N PP + C3-POE 16% (80:20) | HDPE/mPP (20:80) | HDPE/mPP (20:80) | HDPE/mPP (20:80) |
| Kind of homopolypropylene | Comparative Example 1-1 | Comparative Example 1-1 | Comparative Example 1-2 | Comparative Example 1-3 | Comparative Example 1-4 |
| Form | Bicomponent | blend | Bicomponent | Bicomponent | Bicomponent |
| Cooling Air/ Suction Blower (rpm) | 30/30 | 25/26 | 30/30 | 30/30 | 30/30 |
| Cooling Air Temp (° C.) | 14 | 13 | 14 | 14 | 14 |

Experimental Example 3: Evaluation of the Properties of Spunbond Non-Woven Fabric For the non-woven fabrics prepared in Examples and Comparative Examples, the properties were evaluated as follows, and the results were shown in the following Table 4.

(1) Basis weight of non-woven fabric(gsm, g/m²)

The weight of non-woven fabric prepared by extruding into an extra fine denier fiber web was measured, and the weight of the non-woven fabric per unit area was calculated.

(2) Processability: Processability of the prepared non-woven fabric was evaluated according to the following standard.

<Evaluation Standard>

⊚: No fiber cut and low hume generation, excellent processability

○: No fiber cut, average processability

X: Fiber cut generated, poor processability (3) Evaluation of tensile strength (MD/CD, N/5 cm)

According to cut-strip method of ASTM D-5035, using UTM (Universal Testing Systems, Instron), under basis weight(g/m²) conditions described in the following Table 4, tensile strengths(N/5 cm) in machine direction(MD) and cross direction(CD) were respectively measured.

(4) Kinetic coefficient: measured according to ASTM D1894.

(5) Evaluation of softness

Using Handle-O-meter instrument of Thwing-Albert Instrument Company, under basis weight(g/m²) conditions described in the following Table 4, softnesses(Total Hand, g) in MD and CD of the non-woven fabric were respectively measured. Wherein, the measured total hand value has an error of ±25%, which is a deviation known from the manufacturing company.

TABLE 4

|  | Example | | | | Comparative Example | | | | | |
| --- | --- | --- | --- | --- | --- | --- | --- | --- | --- | --- |
|  | 2-1 | 2-2 | 2-3 | 2-4 | 2-1 | 2-2 | 2-3 | 2-4 | 2-5 | 2-6 |
| Non-woven fabric basis weight (g/m²) | 25 | 25 | 25 | 25 | 25 | 25 | 25 | 25 | 25 | 25 |
| Processability | ◎ | ◎ | ◎ | ◎ | ◎ | X | ◎ | ◎ | X | X |
| Tensile strength (MD/CD, N/5 cm) | 44.8/22.1 | 47.8/23.4 | 49.4/25.2 | 52.5/26.2 | 42.0/20.8 | — | 47.2/23.8 | 39.8/18.8 | — | — |
| Kinetic coefficient | 0.034 | 0.031 | 0.034 | 0.032 | 0.035 | — | 0.031 | 0.032 | — | — |
| Total Hand (MD /CD) (g) | 13.6/8.5 | 13.9/8.5 | 13.6/9.0 | 14.0/8.7 | 13.6/8.9 | — | 13.5/8.5 | 14.0/8.5 | — | — |

As the results of experiments, the spunbond non-woven fabrics of Examples 2-1 to 2-4 not only exhibited excellent strength, but also exhibited excellent softness.

Meanwhile, in Comparative Examples 2-1 and 2-2 respectively using high density polyethylene and polypropylene prepared using a Ziegler-Natta catalyst, in the case of Comparative Example 2-1 wherein Cooling Air/Suction Blower (rpm) and Cooling Air Temp were lowered when preparing non-woven fabric, processability and softness equivalent to Examples were exhibited, but tensile strength decreased and kinetic coefficient increased. And, in the case of Comparative Example 2-2 applying the same non-woven fabric preparation conditions as Examples, processability was significantly deteriorated such as fiber cut generation, and thus, it was difficult to prepare non-woven fabric and evaluate the properties.

And, in the case of Comparative Example 2-3 wherein polypropylene prepared using a Ziegler Natta catalyst and polyolefin comprising propylene (C3-POE) were used in combination, non-woven fabric could be prepared under preparation conditions of lowered Cooling Air/Suction Blower (rpm) and Cooling Air Temp, compared to Examples, and the prepared non-woven fabric was improved compared to other Comparative Examples, but exhibited lowered tensile strength and softness compared to Examples.

And, in the case of Comparative Example 2-4 using high density polyethylene, and homopolypropylene prepared in Comparative Example 1-2, excellent processability and softness equivalent to Examples were exhibited, but tensile strength was significantly deteriorated.

In the case of Comparative Examples 2-5 and 2-6, due to high residual stress of homopolypropylene, generation of fiber cut increased during the preparation of non-woven fabric, and processability was significantly deteriorated, and thus, it was difficult to prepare non-woven fabric and evaluate the properties.

The invention claimed is:

1. A resin composition for core-sheath type bi-component fiber comprising:
   core component comprising homopolypropylene fulfilling the following requirements (i) to (v):
   (i) molecular weight distribution of 2.4 or less,
   (ii) residual stress rate of 0.05% or less,
   (iii) melt index, measured under load of 2.16 kg at 230° C. according to ASTM D1238, of 20 to 40 g/10 min,
   (iv) tacticity of 98% or more,
   (v) melting point of 155° C. or less; and
   sheath component comprising high density polyethylene having density measured according to ASTM D1505 of 0.930 g/cm³ or more.

2. The resin composition for core-sheath type bi-component fiber according to claim 1, wherein shear viscosity of the homopolypropylene in the shear rate section of 500 1/s, measured according to ASTM D3835, is 90 to 120 Pa·s.

3. The resin composition for core-sheath type bi-component fiber according to claim 1, wherein the homopolypropylene has total volatile organic compounds content of 30 ppm or less, based on the total weight of the homopolypropylene.

4. The resin composition for core-sheath type bi-component fiber according to claim 1, wherein the molecular weight distribution of the homopolypropylene is 2.0 to 2.4.

5. The resin composition for core-sheath type bi-component fiber according to claim 1, wherein the residual stress rate of the homopolypropylene is 0.005 to 0.05%.

6. The resin composition for core-sheath type bi-component fiber according to claim 1, wherein the melting point of the homopolypropylene is 140 to 155° C.

7. The resin composition for core-sheath type bi-component fiber according to claim 1, wherein the density of the high density polyethylene is 0.930 to 0.970 g/cm³.

8. The resin composition for core-sheath type bi-component fiber according to claim 1, wherein melt index of the high density polyethylene, measured under load of 2.16 kg at 230° C. according to ASTM D1238, is 10 to 40 g/10 min.

9. The resin composition for core-sheath type bi-component fiber according to claim 1, wherein melting point of the high density polyethylene is 120 to 135° C.

10. The resin composition for core-sheath type bi-component fiber according to claim 1, wherein the core component and the sheath component are included at a weight ratio of 70:30 to 90:10.

11. A method for preparing core-sheath type bi-component fiber, comprising steps of:
   polymerizing propylene while introducing hydrogen gas in an amount of 300 to 500 ppm based on the total weight of propylene, in the presence of a catalyst comprising a transition metal compound of the following Chemical Formula 1, to prepare homopolypropylene fulfilling the following requirements (i) to (v):
   (i) molecular weight distribution of 2.4 or less,
   (ii) residual stress rate of 0.05% or less,
   (iii) melt index, measured under load of 2.16 kg at 230° C. according to ASTM D1238, of 20 to 40 g/10 min,
   (iv) tacticity of 98% or more,
   (v) melting point of 155° C. or less;
   preparing a resin composition for core-sheath type bi-component fiber using the homopolypropylene as a core component, and high density polyethylene having density measured according to ASTM D1505 of 0.930 g/cm³ or more as a sheath component; and
   melt spinning the resin composition for core-sheath type bi-component fiber to prepare core-sheath type bi-component fiber comprising a core comprising the homopolypropylene and a sheath comprising the high density polyethylene,

[Chemical Formula 1]

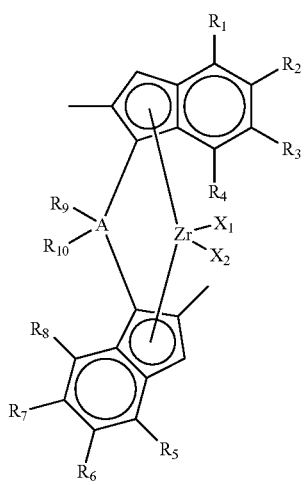

in the Chemical Formula 1,
A is carbon, silicon or germanium,
$X_1$ and $X_2$ are each independently, halogen,
$R_1$ and $R_5$ are each independently, $C_{6-20}$ aryl substituted with $C_{1-20}$ alkyl, $R_2$ to $R_4$ and $R_6$ to $R_8$ are each independently, hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, and
$R_9$ and $R_{10}$ are identical to each other, and are $C_{2-20}$ alkyl.

12. The method for preparing a core-sheath type bi-component fiber according to claim 11, wherein A is silicon (Si), $R_1$ and $R_5$ are each independently, a phenyl group substituted with a $C_{3-6}$ branched alkyl group, and $R_9$ and $R_{10}$ are identical to each other, and are a $C_{2-4}$ linear alkyl group.

13. The method for preparing a core-sheath type bi-component fiber according to claim 11, wherein the compound of the Chemical Formula 1 is a compound represented by the following Chemical Formula 1a,

[Chemical Formula 1a]

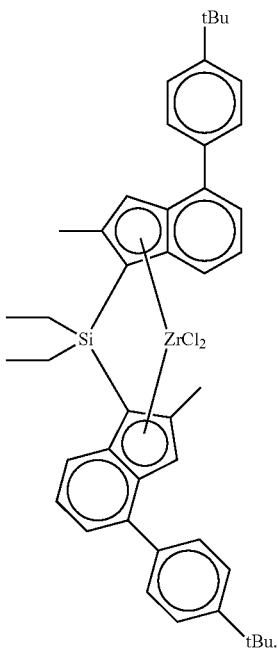

14. Non-woven fabric comprising core-sheath type bi-component fiber, wherein the core comprises homopolypropylene fulfilling the following requirements (i) to (v):
   i) molecular weight distribution of 2.4 or less,
   (ii) residual stress rate of 0.05% or less,
   (iii) melt index, measured under load of 2.16 kg at 230° C. according to ASTM D1238, of 20 to 40 g/10 min,
   (iv) tacticity of 98% or more
   (v) melting point of 155° C. or less, and
   the sheath comprises high density polyethylene having density measured according to ASTM D1505 of 0.930 g/cm³ or more.

15. The non-woven fabric according to claim 14, wherein the non-woven fabric is spunbond non-woven fabric.

16. The resin composition for core-sheath type bi-component fiber according to claim 1, wherein the high density polyethylene is ethylene homopolymer or copolymer of ethylene and alpha olefin monomers, and the alpha olefin monomers is one or more selected from the group consisting of propylene, 1-butene, 1-pentene, 4-methyl-1-pentene, 1-hezene, 1-heptene, 1-octene, 1-decene, 1-undecene, 1-dodecene, 1-tetradecene, 1-hexadecene and 1-eicosene.

17. The resin composition for core-sheath type bi-component fiber according to claim 16, wherein when the high density polyethylene is the copolymer of ethylene and alpha olefin monomers, the alpha olefin monomers are included in an amount of 0.1 wt % or more and 20 wt % or less.

18. The method for preparing a core-sheath type bi-component fiber according to claim 11, wherein the melt spinning process is conducted in the sequence of:
   Step 1: spinning each of the core component and the sheath component in a molten state to prepare spun filaments;
   Step 2: cooling the spun filaments at an air flow of 25 to 35 rpm under 10 to 20° C.; and
   Step 3: binding the cooled filaments with each other.

* * * * *